United States Patent
Fujikami et al.

(10) Patent No.: US 10,034,162 B2
(45) Date of Patent: Jul. 24, 2018

(54) RADIO COMMUNICATION SYSTEM AND RADIO COMMUNICATION APPARATUS

(71) Applicant: MITSUBISHI ELECTRIC CORPORATION, Tokyo (JP)

(72) Inventors: Shintaro Fujikami, Tokyo (JP); Yukimasa Nagai, Tokyo (JP); Takenori Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 56 days.

(21) Appl. No.: 15/119,357

(22) PCT Filed: Feb. 27, 2015

(86) PCT No.: PCT/JP2015/055865
§ 371 (c)(1),
(2) Date: Aug. 16, 2016

(87) PCT Pub. No.: WO2015/133400
PCT Pub. Date: Sep. 11, 2015

(65) Prior Publication Data
US 2017/0064533 A1 Mar. 2, 2017

(30) Foreign Application Priority Data
Mar. 3, 2014 (JP) .................................. 2014-040784

(51) Int. Cl.
*H04W 8/00* (2009.01)
*H04L 29/12* (2006.01)
(Continued)

(52) U.S. Cl.
CPC ......... *H04W 8/005* (2013.01); *H04L 61/6022* (2013.01); *H04W 4/04* (2013.01);
(Continued)

(58) Field of Classification Search
CPC ......... H04W 4/04; H04W 4/046; H04W 8/00; H04W 8/005; H04W 48/16; H04W 76/02; H04W 84/12; H04L 61/6022; H04L 29/12
See application file for complete search history.

(56) References Cited

U.S. PATENT DOCUMENTS 9,743,353 B2 * 8/2017 Kim ...................... H04W 74/08
2003/0163248 A1 * 8/2003 Mizuishi ............... G08G 1/0104
701/117

(Continued)

FOREIGN PATENT DOCUMENTS

JP 2002-204200 A 7/2002
JP 2003-173499 A 6/2003
(Continued)

OTHER PUBLICATIONS

IEEE Computer Society, 802.11(TM)—2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, pp. 978-980.

*Primary Examiner* — Tri H Phan
(74) *Attorney, Agent, or Firm* — Birch, Stewart, Kolasch & Birch, LLP

(57) ABSTRACT

A radio communication system includes a plurality of radio communication apparatuses including an active scan terminal and a passive scan terminal. After transmitting a probe request frame from one frequency channel, the active scan terminal continuously transmits the probe request frame from other frequency channels without waiting for a response frame from the other radio communication apparatuses, thereafter transmits the probe request frame from a response channel, which is a waiting channel, and waits for a response from the passive scan terminal, and superim- (Continued)

poses, on the probe request frame, information concerning an offset time to the response and information concerning the response channel, and, after receiving the probe request frame, after the elapse of the offset time to the response, the passive scan terminal transmits a response frame from a frequency channel designated by the response channel information.

13 Claims, 12 Drawing Sheets

(51) Int. Cl.
   *H04W 4/04* (2009.01)
   *H04W 48/16* (2009.01)
   *H04W 76/10* (2018.01)
(52) U.S. Cl.
   CPC ........... *H04W 4/046* (2013.01); *H04W 48/16* (2013.01); *H04W 76/10* (2018.02)

(56) References Cited

U.S. PATENT DOCUMENTS

| | | | |
|---|---|---|---|
| 2006/0251025 A1 | 11/2006 | Kwon et al. | |
| 2010/0110949 A1* | 5/2010 | Lundsgaard | H04W 48/16 370/311 |
| 2011/0205990 A1 | 8/2011 | Inada | |
| 2012/0300761 A1* | 11/2012 | Vasko | H04W 48/16 370/338 |
| 2013/0109314 A1* | 5/2013 | Kneckt | H04W 4/80 455/41.2 |
| 2013/0176897 A1* | 7/2013 | Wang | H04W 12/06 370/254 |
| 2014/0016511 A1* | 1/2014 | Segev | H04W 48/16 370/255 |
| 2014/0064128 A1* | 3/2014 | Park | H04W 48/12 370/252 |
| 2015/0009878 A1* | 1/2015 | Kim | H04W 4/70 370/311 |
| 2015/0156709 A1* | 6/2015 | Shukla | H04W 48/16 370/338 |
| 2015/0156722 A1* | 6/2015 | Kim | H04W 52/0216 370/311 |
| 2016/0021680 A1* | 1/2016 | Choi | H04W 52/0216 370/311 |
| 2016/0345277 A1* | 11/2016 | Segev | H04W 56/001 |
| 2017/0332314 A1* | 11/2017 | Yunoki | H04W 76/02 |

FOREIGN PATENT DOCUMENTS

| | | |
|---|---|---|
| JP | 2004-220143 A | 8/2004 |
| JP | 2005-202874 A | 7/2005 |
| JP | 2006-024103 A | 1/2006 |
| JP | 2007-233478 A | 9/2007 |
| JP | 2007-274252 A | 10/2007 |
| JP | 2009-015494 A | 1/2009 |
| JP | 2009-015587 A | 1/2009 |
| JP | 2009-104230 A | 5/2009 |
| JP | 2009-123105 A | 6/2009 |
| JP | 2011-176583 A | 9/2011 |
| JP | 2011-253403 A | 12/2011 |
| JP | 2012-209893 A | 10/2012 |

* cited by examiner

RADIO COMMUNICATION SYSTEM AND RADIO COMMUNICATION APPARATUS

FIELD

The present invention relates to a radio communication system and a radio communication apparatus.

BACKGROUND

In recent years, a radio communication apparatus that makes use of a wireless LAN (Local Area Network) is mounted on a vehicle-mounted apparatus. On the other hand, smartphones and tablet terminals are widely spread and a large number of pedestrians own radio communication apparatuses. Therefore, it is under consideration to perform danger prediction making use of radio communication between the radio communication apparatus of the vehicle-mounted apparatus and the radio communication apparatuses of the pedestrians (inter-pedestrian-vehicle communication or inter-road-vehicle communication). In the radio communication between the radio communication apparatuses, a usable frequency channel is probed, that is, searched to find a communication partner terminal and, if the communication partner terminal is communicable, communication is started.

As means for finding a communication partner in an infrastructure mode of IEEE (the Institute of Electrical and Electronics Engineers, Inc.) 802.11a/b/g/n/ac in a wireless LAN, active scanning and passive scanning have been present.

In the active scanning, the radio communication apparatus starts the active scanning as soon as the radio communication apparatus receives an "MLME-SCAN. request" primitive, a "ScanType" of which is active scan.

Note that the "MLME-SCAN. request" primitive refers to a primitive, that is, a command generated by an SME (Station Management Entity) when the radio communication apparatus searches for a communication partner and notified to an MLME (MAC subLayer Management Entity).

In the active scanning, the radio communication apparatus stays on standby until a probe delay time, which is a fixed time, elapses in a certain frequency channel or the radio communication apparatus receives a beacon frame transmitted from an access point. When the radio communication apparatus does not receive the beacon frame and the probe delay time, which is the fixed time, elapses, the radio communication apparatus starts a broadcast of a probe request frame for finding a communication partner. After starting transmission of a probe request, the radio communication apparatus starts a probe timer and determines whether a "PHY-CCA. indication (Busy)" is passed from a physical layer to a MAC (Medium Access Control) layer within a "MinChannelTime", which is a fixed time after the start.

Note that the "PHY-CCA. indication (Busy)" is a primitive, that is, a command for notifying from the physical layer to the MAC layer that a frequency channel is used by another radio communication apparatus.

When the "PHY-CCA. indication (Busy)" is not notified from the physical layer to the MAC layer within the "MinChannelTime", the radio communication apparatus starts a scan in the next frequency channel.

On the other hand, when the "PHY-CCA. indication (Busy)" is notified from the physical layer within the "MinChannelTime", after the elapse of a "MaxChannelTime" from the start of the probe timer, the radio communication apparatus performs processing of received all probe responses and thereafter starts a scan in the next frequency channel.

Note that the "MinChannelTime" is a minimum time consumed in frequency channels in the scan. The "MaxChannelTime" is a maximum time consumed in the frequency channels in the scan. The "MaxChannelTime" is defined as a value equal to or larger than the "MinChannelTime". The operation described above is performed in frequency channels designated by a "ChannelList".

A radio communication apparatus that searches for a communication partner is represented as a terminal STA1 and a communication partner radio communication apparatus is represented as a terminal AP1. The terminal STA1 searching for a communication partner starts a broadcast of a probe request frame after determining a frequency channel to be scanned.

The terminal AP1, which receives the probe request frame, transmits a probe response frame to the terminal STA1 after the elapse of a DIFS (DCF (Distributed Coordination Function) InterFrame Space) time. The terminal STA1, which receives the probe response frame, transmits an ACK (acknowledgement) frame after the elapse of an SIFS (Short InterFrame Space) time. The terminal STA1 starts processing of received all probe responses after the elapse of the "MaxChannelTime" from the start of the transmission of the probe request. The terminal STA1 sets a "ScanType" to start the active scanning or the passive scanning. The STA1 sets time until the transmission of the probe request according to the probe delay time. A value of the "MinChannelTime" and a value of the "MaxChannelTime" are also set to fixed values according to the "MinChannelTime" and the "MaxChannelTime".

Concerning the frequency channel to be scanned, a physical frequency list usable by terminals is set according to the "ChannelList". When receiving the probe response frame, the physical layer of the radio communication apparatus notifies the MAC layer of the "PHY-CCA. indication (Busy)". The presence of the "PHY-CCA. Indication (Busy)" means that the probe response frame is received from another radio communication apparatus and means that there is another radio communication apparatus currently using the frequency channel and it is likely that the radio communication apparatus can communicate with the other radio communication apparatus. The absence of the "PHY-CCA. indication (Busy)" means that another radio communication apparatus is absent.

In the above explanation, if the "PHY-CCA. indication (Busy)" is present, it is assumed that a candidate of a communication partner is present in the frequency channel. If the "PHY-CCA. indication (Busy)" is absent, a candidate of a communication partner is absent in the frequency channel.

In the passive scanning, the radio communication apparatus starts the passive scanning as soon as the radio communication apparatus receives a "MLME-SCAN. request" primitive, a "ScanType" of which is a passive scan. The radio communication apparatus starting the passive scanning waits for beacon frames from frequency channels designated by the "ChannelList" and waits for beacon frames in the next channel after the elapse of the "MaxChannelTime".

As an example, Patent Literature 1 discloses a technology in which, in direct communication between radio communication apparatuses not via an access point, terminals of the radio communication apparatuses set the order of a scan of frequency channels at random, determine, at random, scanning start time in scanning the frequency channels, determine the "MaxChannelTime" and the "MinChannelTime" at random in a range in which the "MaxChannelTime" and the "MinChannelTime" respectively do not exceed a maximum of the "ChannelTime" and a maximum of the "MinChannelTime", and perform a sequential scan to detect the terminals early.

CITATION LIST

Patent Literature

Patent Literature 1: Japanese Patent Application Laid-Open No. 2012-209893

Non-Patent Literature

Non-Patent Literature 1: IEEE Computer Society, 802.11™-2012-IEEE Standard for Information technology—Telecommunications and information exchange between systems Local and metropolitan area networks—Specific requirements Part 11: Wireless LAN Medium Access Control (MAC) and Physical Layer (PHY) Specifications

SUMMARY

Technical Problem

However, according to the conventional technology described above, in a situation in which all radio communication apparatuses in frequency channels should be detected early, for example, a radio communication apparatus mounted on a vehicle moving at high speed such as an automobile and a radio communication apparatus outside the vehicle communicate with each other, it is necessary to scan the frequency channels at high speed and sequentially. Therefore, there is a problem in that a long time is required to find the radio communication apparatuses.

In the active scanning in Non-Patent Literature 1, which is an example, frequency channels usable by the terminals are sequentially scanned. A minimum time for scanning the usable frequency channels is the "MinChannelTime". For example, when eleven channels in a 2.4 GHz band, that is, Ch1 to Ch11 are used, a minimum time required for one scan is "MinChannelTime×11+channel change time×11+probe request transmission processing time". A maximum time required for one scan is "MaxChannelTime×11+channel change time×11+probe request transmission processing time+probe response reception processing time".

In the detection method for the terminals in Patent Literature 1, which is an example, when the usable frequency channels are scanned, for example, when the eleven channels in the 2.4 GHz band, that is, the Ch1 to the Ch11 are used, the required minimum time is "MinChannelTime×11+ channel change time×11+probe request transmission processing time". Note that the "MinChannelTime" is a random value equal to or smaller than a MinChannelTime maximum. The required maximum time is "MaxChannelTime× 11+channel change time×11+probe request transmission processing time+probe response reception processing time". Note that the "MaxChannelTime" is a random value equal to or smaller than a MaxChannelTime maximum.

The present invention has been devised in view of the above and it is an object of the present invention to obtain a radio communication apparatus capable of finding other radio communication apparatuses in a shorter time than in the past.

Solution to Problem

According to an aspect of the present invention in order to solve the problems and achieve the object, there is provided a radio communication system including: a plurality of radio communication apparatuses including an active scan terminal and a passive scan terminal, wherein the active scan terminal is configured to: after transmitting a probe request frame from one frequency channel, transmit the probe request frame from other frequency channels without waiting for a response frame from the other radio communication apparatuses; thereafter finally transmit the probe request frame from a response channel, which is a waiting channel, and wait for a response from the passive scan terminal; and superimpose, on the probe request frame, information concerning an offset time to the response and information concerning the response channel, and the passive scan terminal is configured to: after receiving the probe request frame, after elapse of the offset time to the response, transmit a probe response frame from a frequency channel designated by the response channel information.

Advantageous Effects of Invention

According to the present invention, there is an effect that it is possible to obtain a radio communication apparatus capable of finding another radio communication apparatus in a shorter time than in the past.

DESCRIPTION OF EMBODIMENTS

Embodiments of a radio communication apparatus according to the present invention are described in detail below with reference to the drawings. Note that the present invention is not limited by the embodiments.

First Embodiment

Figure 1:
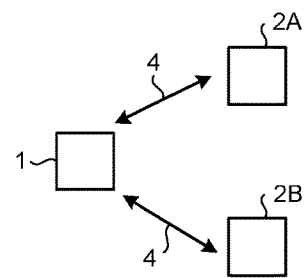
FIG. 1 is a diagram illustrating an example of the configuration of a radio communication system including a radio communication apparatus according to a first embodiment.

FIG. 1 is a diagram illustrating an example of the configuration of a first embodiment of a radio communication system including a radio communication apparatus according to the present invention. The radio communication apparatus 1 is a vehicle-mounted apparatus set in an automobile and is a wireless LAN base station. The radio communication apparatus 1 operates as an access point referred to as AP or a Wi-Fi base station and performs communication with radio communication apparatuses 2A and 2B through wireless links 4. The radio communication apparatuses 2A and 2B operate as STA terminal stations which are wireless LAN terminal stations. Note that, in FIG. 1, the radio communication apparatus 1 is a wireless LAN base station and the radio communication apparatuses 2A and 2B are wireless LAN terminal stations. However, the present invention is not limited to this. The wireless links 4 only have to be wireless links that use a frequency band used by a wireless LAN apparatus in a 2.4 GHz band, a 5 GHz band, or a 60 GHz band. A channel of any one of the frequency bands can be used or channels of a plurality of frequency bands selected from the frequency bands can be used.

Figure 2:
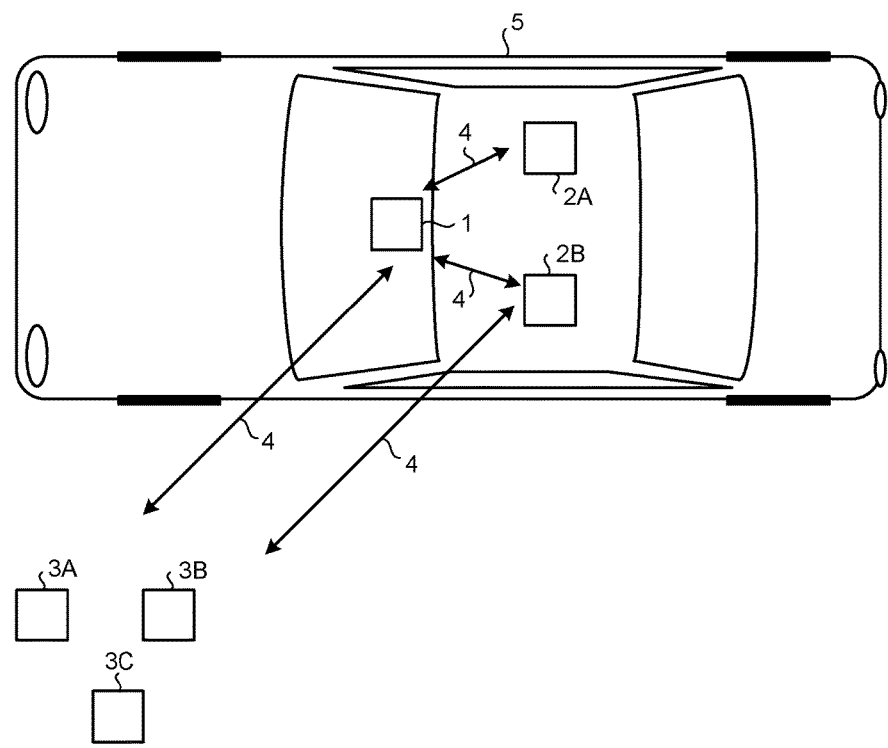
FIG. 2 is a diagram illustrating an application example, which is an example of the configuration of the radio communication system including the radio communication apparatus according to the first embodiment.

FIG. 2 is a diagram illustrating an application example, which is an example of the configuration of the first embodiment of the radio communication system including the radio communication apparatus according to the present invention. In the radio communication system illustrated in FIG. 2, the radio communication apparatus 1 is fixed to an automobile 5, the radio communication apparatuses 2A and 2B are carried into the automobile 5, and the radio communication apparatuses 1, 2A, and 2B perform communication with radio communication apparatuses 3A, 3B, and 3C outside the vehicle. As the radio communication apparatus 1 fixed to the automobile 5, a head unit of an automobile, a car navigation apparatus, a car audio apparatus, and a rear sheet monitor can be illustrated. As the radio communication apparatus 2A and 2B, a tablet terminal, a smartphone, a portable game apparatus, a music player, and a personal computer can be illustrated. Similarly, as the radio communication apparatuses 3A, 3B, and 3C, a slate PC, which is a table terminal, a smartphone, a portable game apparatus, a base station or a relay station of a hot spot, which is a public wireless LAN base station, and a digital signage adapted to a wireless LAN can be illustrated. Note that the present invention is not limited to configurations and operation systems of the illustrated apparatuses.

Figure 3:
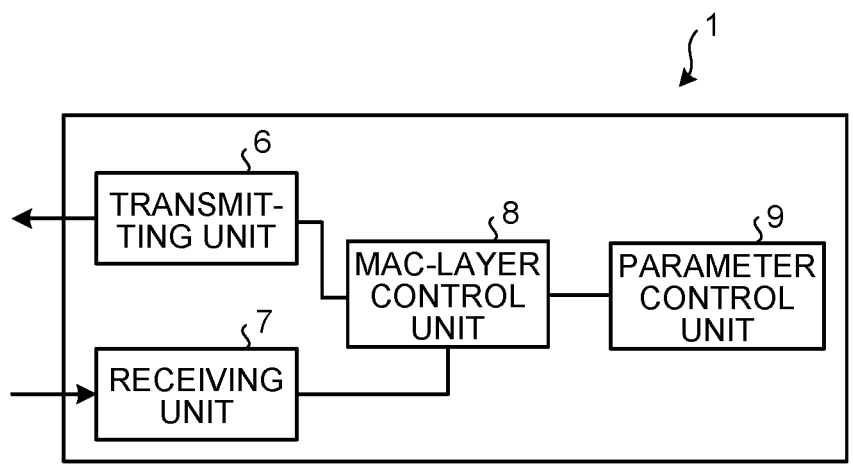
FIG. 3 is a diagram illustrating an example of the configuration of the radio communication apparatus in the first embodiment.

FIG. 3 is a diagram illustrating an example of the configuration of the radio communication apparatus 1 in this embodiment. In FIG. 3, a transmitting unit 6, a receiving unit 7, a MAC-layer control unit 8, and a parameter control unit 9 are illustrated. Note that the radio communication apparatuses 2A and 2B and the radio communication apparatuses 3A, 3B, and 3C have the same configuration.

The transmitting unit 6 is a communication circuit that performs radio communication and has a transmission function conforming to IEEE 802.11. The transmitting unit 6 performs transmission of a wireless LAN frame notified from the MAC-layer control unit 8 and performs determination of a carrier sense by CSMA/CA.

The receiving unit 7 is a communication circuit that performs radio communication and has a reception function conforming to THE IEEE 802.11. The receiving unit 7 performs reception of the wireless LAN frame and performs determination of transmission of an ACK frame for the wireless LAN frame, a destination of which is a unicast.

The MAC-layer control unit 8 performs control of a frequency channel in performing a scan, performs control of frame transmission by a probe timer, and transmits the wireless LAN frame on the basis of information notified from the parameter control unit 9.

The parameter control unit 9 determines parameters in a "MLME-SCAN. request" primitive and performs communication to the MAC-layer control unit 8 in performing a scan.

Figure 15:
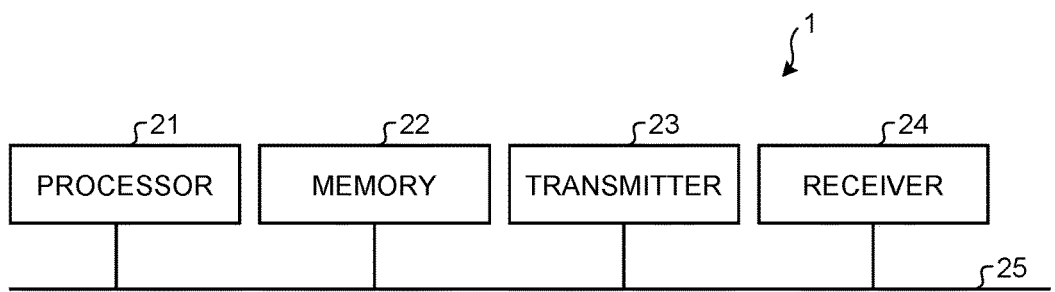
FIG. 15 is a diagram illustrating an example of a hardware configuration for realizing the first embodiment.

FIG. 15 is a diagram illustrating an example of a hardware configuration for realizing the radio communication apparatuses 1, 2A, 2B, 3A, 3B, and 3C according to the first embodiment. The MAC-layer control unit 8 and the parameter control unit 9 are realized by a processor 21 executing a program stored in a memory 22. The receiving unit 7 corresponds to a receiver 24. The transmitting unit 6 corresponds to a transmitter 23. The processor 21, the memory 22, the transmitter 23, and the receiver 24 are connected by a system bus 25. The radio communication apparatuses can include a plurality of processors 21 and a plurality of memories 22. The processors 21 and the memories 22 can execute the functions illustrated in the block diagram of FIG. 3 in cooperation with each other. Note that the radio communication apparatuses 1, 2A, 2B, 3A, 3B, and 3C can be implemented by either software or hardware.

The radio communication apparatus 1, the radio communication apparatuses 2A and 2B, and the radio communication apparatuses 3A, 3B, and 3C are classified into active scan terminals and passive scan terminals. The active scan terminals perform active scanning. The passive scan terminals do not perform the active scanning, receive probe request frames transmitted from the active scan terminals, and perform responses with probe response frames. In FIG. 2, the radio communication apparatus 1 and the radio communication apparatuses 2A and 2B are the active scan terminals and the radio communication apparatuses 3A, 3B, and 3C are passive scan terminals.

Figure 4:
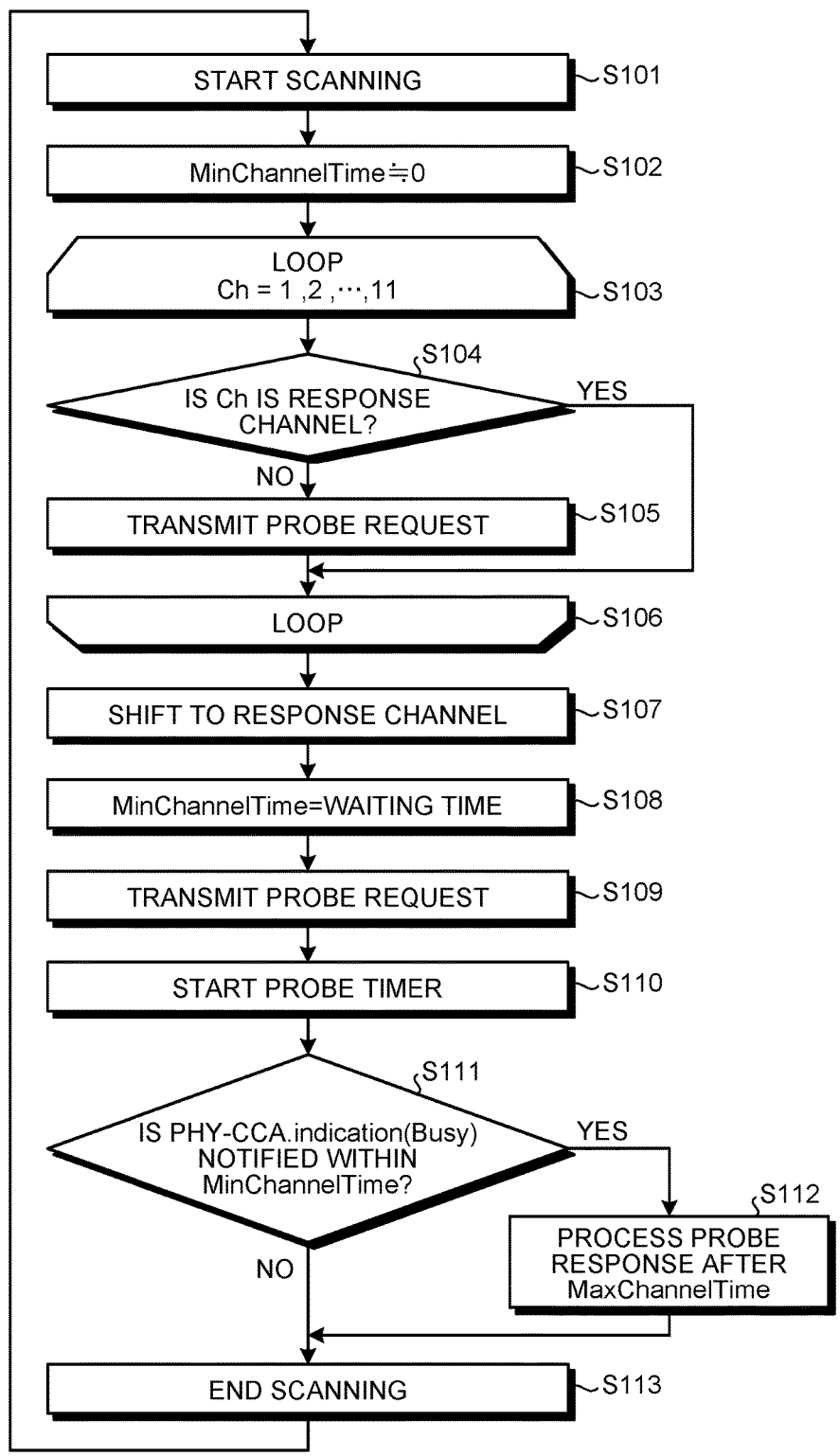
FIG. 4 is a diagram for describing active scanning in the first embodiment.

FIG. 4 is a diagram for describing the active scanning in this embodiment. In FIG. 4, first, the active scan terminal starts scanning (S101), initializes "MinChannelTime" as "MinChannelTime"≡0 (S102), and determines whether Ch1 is a response channel. When the Ch1 is not the response channel, the active scan terminal transmits a probe request. When the Ch1 is the response channel, the active scan terminal does not transmit the probe request. In this way, among the Ch1 to the Ch11, the active scan terminal does not transmit the probe request for the response channel and transmits the probe request for channels that are not the response channels (S103 to S106). That is, after transmitting a probe request frame from one frequency channel, the active scan terminal continuously transmits the probe request frame from other frequency channels without waiting for a response frame. Thereafter, the active scan terminal shifts to the response channel, which is a waiting channel (S107), sets the "MinChannelTime" as "MinChannelTime"=a waiting time (S108), transmits the probe request (S109), starts the probe timer (S110), and determines whether "PHY-CCA. indication (Busy)" is notified within the "MinChannelTime" (S111). When the "PHY-CCA. indication (Busy)" is notified, that is, when processing branches to Yes in S111, the active scan terminal processes the probe response after "MaxChannelTime" (S112). When the "PHY-CCA. indication (Busy)" is not notified, that is, when the processing branches to No in S111, the active scan terminal ends the scanning not through S112 (S113).

Figure 5:
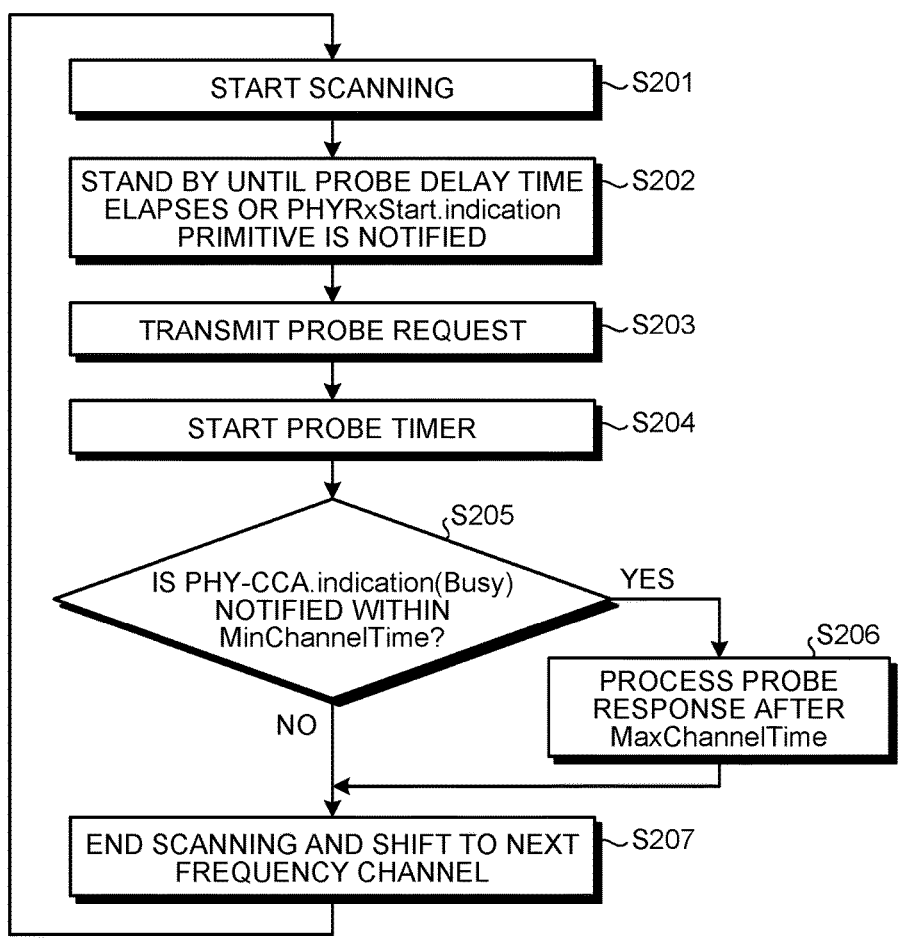
FIG. 5 is a diagram for describing active scanning in a system of a comparative example.

FIG. 5 is a diagram for describing active scanning in a system of a comparative example. In FIG. 5, first, the active scan terminal starts scanning (S201). The active scan terminal stays on standby until a probe delay time elapses or a "PHYRxStart. indication" primitive is notified (S202). The active scan terminal transmits a probe request (S203), starts the probe timer (S204), and determines whether the "PHY-CCA. indication (Busy)" is notified within the "MinChannelTime" (S205). When the "PHY-CCA. indication (Busy)" is notified, that is, when processing branches to Yes in S205, the active scan terminal processes a probe response after the "MaxChannelTime" (S206). When the "PHY-CCA. indication (Busy)" is not notified, that is, when the processing branches to No in S205, the active scan terminal ends the scanning not through S206 and shifts to the next frequency channel (S207). In the system, this processing is sequentially repeated.

Note that, in this embodiment, before the start of the scanning, the "MinChannelTime", the "MaxChannelTime", "ResponseOffSetTime", which is information concerning a response offset time, "Response Channel", which is information concerning a response channel, and "FastScanType" are determined. The "ScanType" is set to an active scan, the "FastScanType" is set to "True", and the probe delay time is set to 0. The "MinChannelTime" is set to "MinChannelTime+ResponseOffSetTime" according to the system of the comparative example. The "MaxChannelTime" is set to "MaxChannelTime+ResponseOffSetTime" according to the system of the comparative example. A list of frequencies to be scanned is registered in the order of scans in the "ChannelList". These parameters are notified from an SME to an MLME by the "MLME-SCAN. request" primitive.

First, as soon as the MAC-layer control unit 8 of the radio communication apparatus receives the "MLME-SCAN. request" primitive, the radio communication apparatus starts scanning. The MAC-layer control unit 8 of the radio communication apparatus selects, as transmission channels, in order, frequency channels designated by the "ChannelList". The MAC-layer control unit 8 of the radio communication apparatus starts a broadcast of a probe request frame in a determined frequency channel. The MAC-layer control unit 8 of the radio communication apparatus immediately changes a channel in use to the next frequency channel after transmitting the probe request frame. Alternatively, the MAC-layer control unit 8 of the radio communication apparatus sets the "MinChannelTime" as "MinChannelTime" and starts the probe timer.

Figure 6:
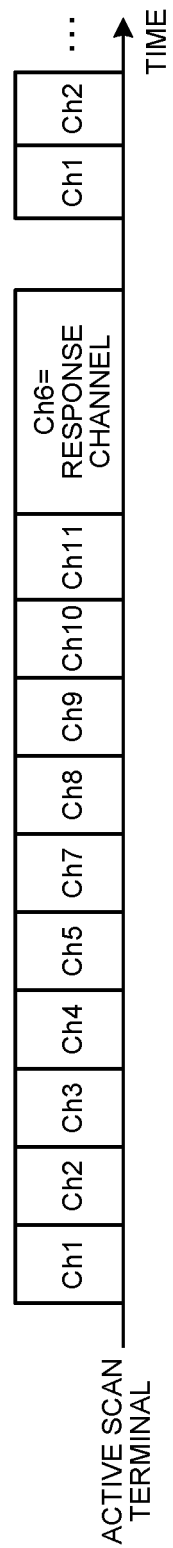
FIG. 6 is a diagram illustrating a change example of frequency channels in the active scanning in the first embodiment.

When performing the transmission of the probe request frame at step S105 in the frequency channels designated by the "ChannelList", as illustrated in FIG. 6, the MAC-layer control unit 8 of the radio communication apparatus puts off the transmission of the probe request frame in the frequency channel designated by the response channel. FIG. 6 is a diagram illustrating a change example of the frequency channels in the active scanning in this embodiment. In FIG. 6, the 2.4 GHz band frequency channels Ch1 to Ch11 are registered in the "ChannelList". The response channel is the Ch6. That is, the MAC-layer control unit 8 determines whether the Ch1 to the Ch11 are the response channel. When the Ch1 to the Ch11 are the response channel, the MAC-layer control unit 8 does not transmit a probe request. When the Ch1 to the Ch11 are not the response channel, the MAC-layer control unit 8 transmits the probe request.

After completing the transmission of the probe request frame in the frequency channels designated by the "ChannelList", the MAC-layer control unit 8 of the radio communication apparatus performs transmission of the probe request frame in the frequency channel designated by the response channel. When transmitting the probe request frame from the frequency channel designated by the response channel, the MAC-layer control unit 8 performs the transmission after setting the "MinChannelTime" to a value of the "MinChannelTime" notified by the "MLME-SCAN. request" primitive.

After starting the probe timer, the MAC-layer control unit 8 of the radio communication apparatus determines whether the "PHY-CCA. indication (Busy)" is notified from the physical layer to the MAC layer within the "MinChannelTime".

When the "PHY-CCA. indication (Busy)" is not notified within the "MinChannelTime", the MAC-layer control unit 8 of the radio communication apparatus ends the waiting for the probe response frame in the response channel and returns to S101. When the "PHY-CCA. indication (Busy)" is not notified, this means that the probe response frame is not received from the other radio communication apparatuses and there is no other radio communication apparatus that is currently using the frequency channels designated by the "ChannelList".

On the other hand, when the "PHY-CCA. indication (Busy)" is notified within the "MinChannelTime", the MAC-layer control unit 8 of the radio communication apparatus starts processing of the received probe response frame after the "MaxChannelTime" from the start of the probe timer. When the "PHY-CCA. indication (Busy)" is notified, this means that the probe response frame is received from the other radio communication apparatuses and there are the other radio communication apparatus that is currently using any one of the frequency channels designated by the "ChannelList" and it is likely that the radio communication apparatus can communicate with the other radio communication apparatuses.

The response offset time is determined by the parameter control unit 9. A value of the response offset time is determined on the basis of the number of frequency channels registered in the "ChannelList". Specifically, the value of the response offset time is set larger than "a value of the number of frequency channels registered in the ChannelList×(the number of times of changes of the frequency channel+ transmission processing time of the probe request)". In this way, the waiting time for a response can be set on the basis of the number of frequency channels for transmitting the probe request frame or can be set on the basis of the received number of response frames.

The frequency channels registered in the "ChannelList" are determined by the parameter control unit 9. Frequency channels that can be registered in the "ChannelList" are frequency channels supported in the standard of the wireless LAN used by the radio communication apparatus and are selected from frequency channels permitted to be used in a country where the radio communication apparatus is used. The MAC-layer control unit 8 of the radio communication apparatus performs a sequential scan in the order of the frequency channels registered in the notified "ChannelList". As the registration order of the "ChannelList", for example, when the frequency channels Ch1 to Ch11 in the 2.4 GHz band are usable, the Ch1 to the Ch11 can be designated in order or can be designated at random. "VendorSpecificInfo" is included in the probe request frame transmitted by the radio communication apparatus, which is the active scan terminal.

Figure 7:
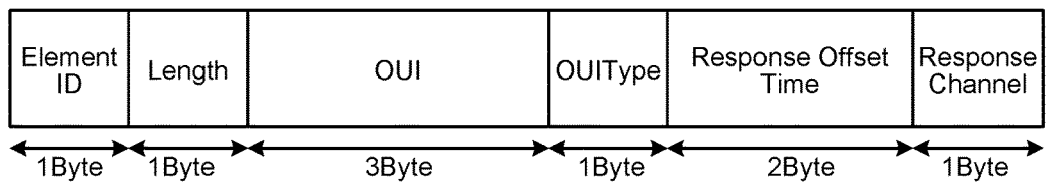
FIG. 7 is a diagram illustrating an example of a frame format of "VendorSpecificInfo" in the first embodiment.

FIG. 7 illustrates an example of a frame format of the "VendorSpecificInfo" in this embodiment. A frame of the VendorSpecificInfo" illustrated in FIG. 7 is configured by "Element ID" of one byte, "Length" of one byte, "OUI" of three bytes, "OUIType" of one byte, "Response Offset Time" of two bytes, and "Response Channel" of one byte. It is assumed that the "OUI" is set to a fixed value "0x002692" and the "OUI Type" is set to a fixed value "0xFF". Note that the "OUI" and the "OUI Type" are not limited to the values and only have to be values that enable distinction from a field of a comparative example, do not affect a wireless LAN apparatus to which the present invention is not applied, and achieve the same effect. As an example, it is also possible to notify the same content using a Reserved field of the existing probe request frame.

Figure 8:
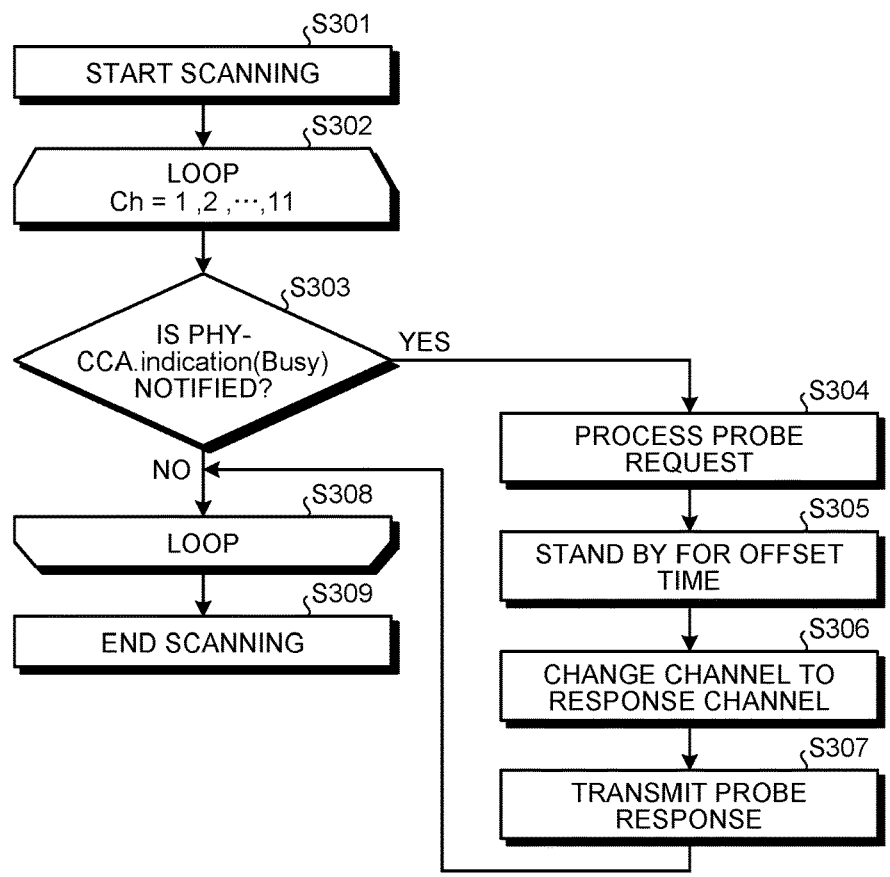
FIG. 8 is a diagram for describing passive scanning in the first embodiment.

FIG. 8 is a diagram for describing the passive scanning in this embodiment. The passive scan terminal starts scanning (S301) and determines whether the "PHY-CCA. indication (Busy)" is notified in the Ch1 (S303). When the "PHY-CCA. indication (Busy)" is notified, that is, when processing branches to Yes in S303, the passive scan terminal processes a probe request (S304), stands by for an offset time (S305), changes a channel to a response channel (S306), and transmits a probe response (S307). When the "PHY-CCA. indication (Busy)" is not notified, that is, when the processing branches to No in S303, the passive scan terminal shifts to the next channel. The passive scan terminal performs the processing on the Ch1 to the Ch11 (S302 to S308) and ends the scanning (S309).

Figure 9:
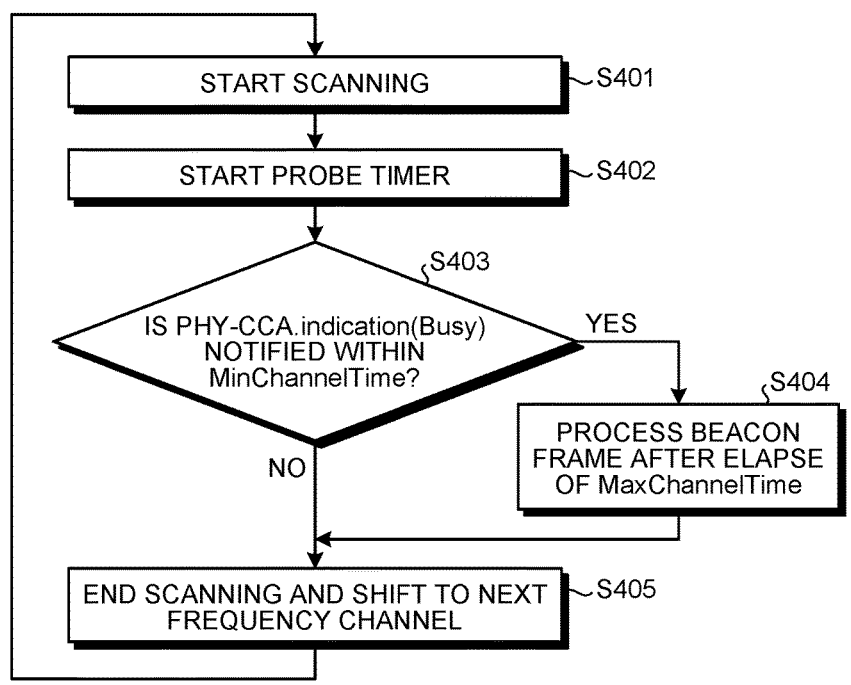
FIG. 9 is a diagram for describing passive scanning in the system of the comparative example.

FIG. 9 is a diagram for describing the passive scanning in the system of the comparative example. The passive scan terminal starts scanning (S401), starts the probe timer (S402), and determines whether the "PHY-CCA. indication (Busy)" is notified within the "MinChannelTime" (S403). When the "PHY-CCA. indication (Busy)" is notified, the passive scan terminal processes a beacon frame after the elapse of the "MaxChannelTime" (S404). When the "PHY-CCA. indication (Busy)" is not notified, the passive scan terminal ends the scanning and shifts to the next frequency channel (S405). In the system, these processing are sequentially repeated.

Note that, in this embodiment, when starting the passive scanning, the radio communication apparatus, which is the passive scan terminal, notifies the "MLME-SCAN. request" primitive, the "ScanType" of which is the passive scan and the "FastScanType" of which is "True", from the SME to the MLME.

The MAC-layer control unit 8 of the radio communication apparatus, which is the passive scan terminal, can change, every time the "MaxChannelTime" elapses, the frequency for waiting for the probe request frame or can fix the frequency channel for the waiting as in the system of the comparative example.

As soon as the MAC-layer control unit 8 of the radio communication apparatus, which is the passive scan terminal, receives the "MLME-SCAN. request" primitive, the MAC-layer control unit 8 waits for a probe request frame transmitted by the radio communication apparatus, which is the active scan terminal, in any one of the frequency channels. The MAC-layer control unit 8 of the radio communication apparatus, which receives the probe request frame, extracts the information illustrated in FIG. 7 from the "VendorSpecificInfo", which is information peculiar to a terminal manufacturer of the probe request frame and, after the elapse of response offset time+DIFS time designated by a response offset time element, transmits a probe response frame to the radio communication apparatus at a probe request frame transmission source from a response channel, which is a waiting channel designated by the response channel element.

After transmitting the probe response frame, the MAC-layer control unit 8 of the radio communication apparatus, which is the passive scan terminal, can return to the original frequency channel or can maintain the frequency channel in which the probe response frame is transmitted. Therefore, if the radio communication apparatus is performing communication with another radio communication apparatus, the radio communication apparatus can also return to the communication channel.

Figure 10:
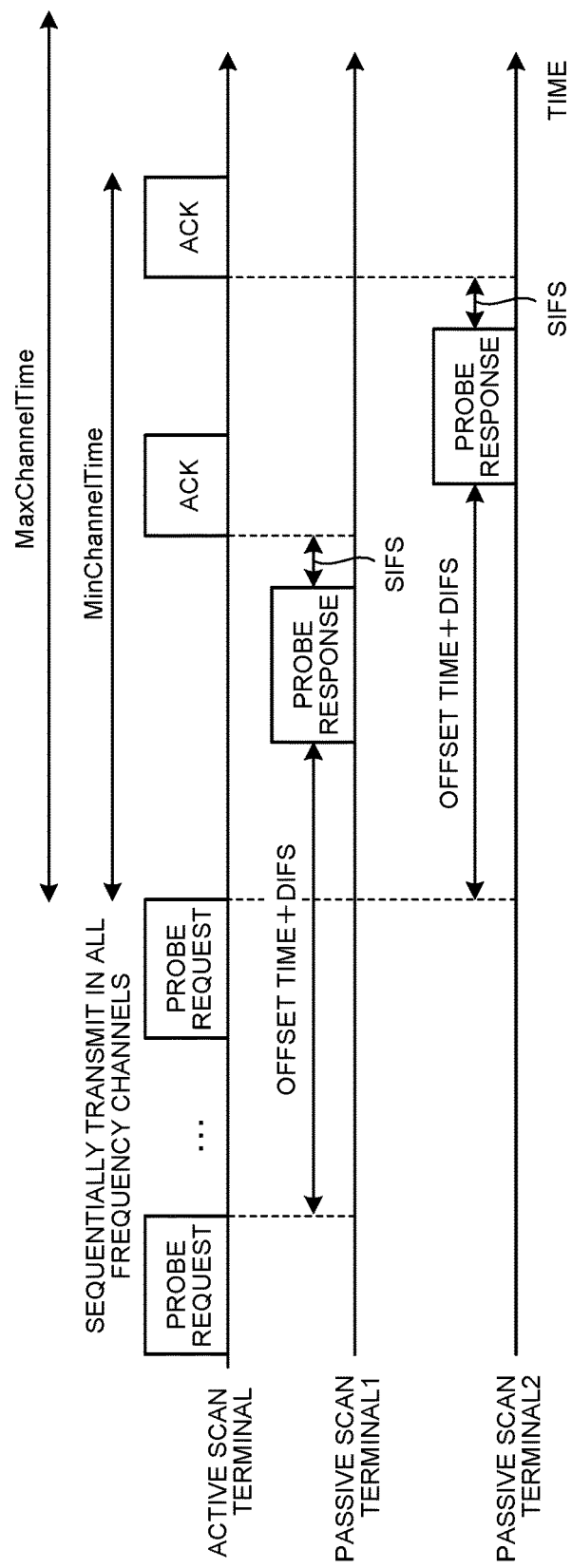
FIG. 10 is a sequence chart for describing the active scanning in the first embodiment.
Figure 11:
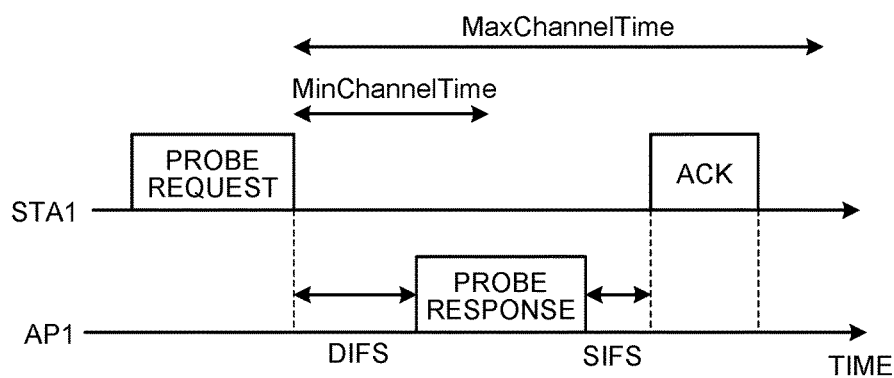
FIG. 11 is a sequence chart for describing the active scanning in the system of the comparative example.

FIG. 10 is a sequence chart for describing the active scanning in this embodiment. FIG. 11 is a sequence chart for describing the active scanning in the system of the comparative example. In FIG. 11, the terminal AP1, which is a communication partner radio communication apparatus, transmits a probe response after the elapse of the DIFS time from the probe request. The terminal STA1, which is the radio communication apparatus searching for a communication partner, transmits ACK after the elapse of an SIFS time from the probe response. However, in FIG. 10, the passive scan terminals 1 and 2 respectively transmit probe responses after the elapse of the offset time+the DIFS time from the probe request. The active scan terminal transmits ACK after the elapse of the SIFS time from the probe response.

The "MLME-SCAN. request", which is a primitive, that is, a command notified to the MLME is described. The "MLME-SCAN. request" is generated by the SME of the radio communication apparatus. In the configuration illustrated in FIG. 3, the MAC-layer control unit 8 corresponds to the MLME and the parameter control unit 9 corresponds to the SME. Therefore, the "MLME-SCAN. request" is generated by the parameter control unit 9 and notified to the MAC-layer control unit 8.

The "MLME-SCAN. request" includes "BSSType", "BSSID", "SSID", "ScanType", "ProbeDelay", "ChannelList", "MinChannelTime", "MaxChannelTime", "RequestInformation", "SSID List", "ChannelUsage", "AccessNetworkType", "HESSID", "MeshID", "ResponseOffSetTime", which is a response offset time, "ResponseChannel", which is a response channel, "FastScanType", and "VendorSpecificInfo". In the present invention, the "ResponseOffSetTime", the "ResponseChannel", and the "FastScanType" are added to the "MLME-SCAN. request".

The response offset time is a value set in the "VendorSpecificInfo" when the radio communication apparatus transmits the probe request frame. The radio communication apparatus, which receives the probe request frame, transmits the probe response frame to the radio communication apparatus at the transmission source after the response offset time elapses.

The "ResponseChannel", which is the response channel, is a value set in the "VendorSpecificInfo" when the radio communication apparatus, which is the active scan terminal, transmits the probe request frame. After transmitting the probe request frame to all of the frequency channels excluding the frequency channel designated by the response channel in the "ChannelList", the radio communication apparatus, which is the active scan terminal, finally performs transmission of the probe request frame in the frequency channel designated by the response channel and thereafter waits for the probe response frame. When transmitting the probe response frame to the radio communication apparatus, which is the active scan terminal at the transmission source, the MAC-layer control unit 8 of the radio communication apparatus, which is the passive scan terminal that receives the probe request frame, transmits the probe response frame from a channel designated by response channel information.

The "FastScanType" is a flag for notifying whether the system of the present invention is applied. When the "FastScanType" is "True", the radio communication apparatus is the active scan terminal if the "ScanType" is the active scan. The radio communication apparatus is the passive scan terminal if the "FastScanType" is "False". The passive scan or the active scan of the system of the comparative example is used.

Note that the "MLME-SCAN. request" described above is an example. The present invention is not limited to this.

According to this embodiment, compared with the system of the comparative example, it is possible to realize high-speed mutual detection of the radio communication apparatuses. Note that, in the system described in this embodiment, the probe request and the probe response are used for the mutual detection of the radio communication apparatuses. However, the mutual detection is not limited to this as long as the same effect can be achieved. For example, the same value is inserted into a data frame and an action frame transmitted by the radio communication apparatus and, after a fixed time, a response is acquired from the radio communication apparatus. Consequently, it is possible to perform the mutual detection even during communication.

In this embodiment, the terminal responding to the probe request frame transmitted by the radio communication apparatus, which is the active scan terminal, only has to be a terminal that can receive the probe request frame. The terminal does not have to operate as the passive scan terminal. For example, when receiving the probe request frame transmitted by the radio communication apparatus, which is another active scan terminal, the radio communication apparatus, which is the active scan terminal, or the terminal operating in the system of the comparative example can respond with the probe response frame.

The radio communication system in this embodiment described above includes the plurality of radio communication apparatuses including the active scan terminal and the passive scan terminal. After transmitting the probe request frame from one frequency channel, the active scan terminal continuously transmits the probe request frame from the other frequency channels without waiting for the response frame from the other radio communication terminals to transmit the probe request frame from all the frequency channels other than the response channel, finally transmits the probe request frame from the response channel, which is the waiting channel, performs waiting for a response from the passive scan terminal, and superimposes, on the probe request frame, information concerning the offset time to the response and information concerning the response channel. After receiving the probe request frame, the passive scan terminal transmits the response frame from a frequency channel designated by the information concerning the response channel after the offset time to the response elapses.

The radio communication apparatus in this embodiment described above is the radio communication apparatus, which is the active scan terminal, of the radio communication system in which the plurality of radio communication apparatuses including the active scan terminal and the passive scan terminal communicate. After transmitting the probe request frame from one frequency channel, the radio communication apparatus continuously transmits the probe request frame from the other frequency channels without waiting for the response frame from the other radio communication apparatuses to transmit the probe request frame from all the frequency channels other than the response channel, finally transmits the probe request frame from the response channel, which is the waiting channel, performs waiting for a response from the passive scan terminal, and superimposes, on the probe request frame, information concerning the offset time to the response and information concerning the response channel.

After receiving the probe request frame from the radio communication apparatus, which is the active scan terminal, the radio communication apparatus, which is the passive scan terminal, transmits the response frame from a frequency channel designated by the information concerning the response channel after the offset time to the response elapses.

For example, in the active scanning in Non-Patent Literature 1, the frequency channels usable by the terminals are sequentially scanned. A minimum time for scanning the usable frequency channels is the "MinChannelTime". For example, when the Ch1 to the Ch11 in the 2.4 GHz band are used, a minimum time required for one scan is "MinChannelTime×11+channel change time×11+probe request transmission processing time". A maximum time required for one scan is "MaxChannelTime×11+channel change time×11+probe request transmission processing time+probe response reception processing time".

According to this embodiment, for example, when the Ch1 to the Ch11 in the 2.4 GHz band are used, a minimum time required for one scan is "MinChannelTime+offset time+channel change time×11+probe request transmission processing time". A maximum time required for one scan is "MaxChannelTime+offset time+channel change time×11+probe request transmission processing time+probe response reception processing time". There is an effect that it is possible to obtain the radio communication apparatus that can find the other radio communication apparatuses at higher speed than in the comparative example.

Second Embodiment

Figure 12:
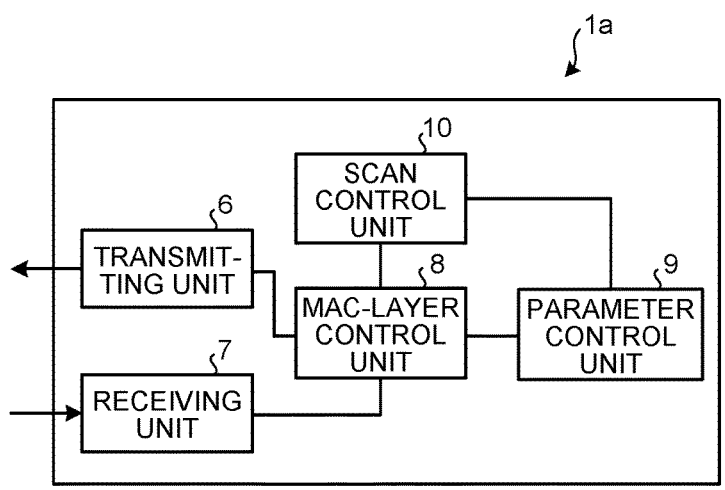
FIG. 12 is a diagram illustrating an example of the configuration of a radio communication apparatus in a second embodiment.

FIG. 12 is a diagram illustrating an example of the configuration of a radio communication apparatus 1*a*, which is a radio communication apparatus in this embodiment and is a modification of the radio communication apparatus 1. In FIG. 12, components common to FIG. 3 are denoted by the same reference numerals. In the configuration illustrated in FIG. 12, a scan control unit 10 is added to the configuration illustrated in FIG. 3. Note that modifications of the radio communication apparatuses 2A and 2B and the radio communication apparatuses 3A, 3B, and 3C in this embodiment also have the same configuration.

In the radio communication apparatus, which is the active scan terminal, the scan control unit 10 periodically receives the number of time of communication of a carrier sense from the MAC-layer control unit 8, calculates a relatively free frequency channel, and notifies the parameter control unit 9 of the frequency channel. The parameter control unit 9 sets a response channel notified to the MAC-layer control unit 8 in an "MLME-SCAN. request" primitive to the frequency channel notified from the scan control unit 10. The number of times of notification of the carrier sense per unit time can be used for the setting of the response channel. The response channel can be set again according to a moving distance of the passive scan terminal. Note that the passive scan terminal can have time when the passive scan terminal does not respond to the active scan terminal to which the passive scan terminal responded once.

In the radio communication apparatus, which is the passive scan terminal, the scan control unit 10 stores a transmission source MAC address of the received probe request frame. When receiving the probe request frame, the MAC-layer control unit 8 inquires the scan control unit 10 about the probe request frame. If the probe request frame has been received from the same transmission source MAC address within a fixed interval, the scan control unit 10 can notify the MAC-layer control unit 8 not to transmit the probe response frame.

In the radio communication apparatus, which is the active scan terminal, the scan control unit 10 monitors a reception state of the probe response frame, which is a response to the probe request frame, and controls a value of the "MaxChannelTime". The scan control unit 10 notifies the parameter control unit 9 to, for example, reduce the value of the "MaxChannelTime" when there are many responses and increase the value of the "MaxChannelTime" when there are relatively few responses. A set threshold value only has to be used for the number of responses. When responses per unit time from the passive scan terminal are less than the threshold, the scan control unit 10 increases a transmission interval of the probe request frame. When responses per unit time from the passive scan terminal are equal to or more than the threshold, the scan control unit 10 reduces the transmission interval of the probe request frame. The scan control unit 10 changes the transmission interval of the probe request frame according to moving speed of the passive scan terminal.

The scan control unit 10 controls the value of the "MaxChannelTime", which is an interval of a sequential scan, according to a moving state of the radio communication apparatus. The scan control unit 10 notifies the parameter control unit 9 to, for example, reduce the value of the "MaxChannelTime" when the radio communication apparatus, which is the active scan terminal, is moving at high speed and increase the value of the "MaxChannelTime" when the radio communication apparatus is not moving. In this way, the sequential scan during the movement of the radio communication apparatus is desirably performed at a shorter interval than the sequential scan during a stop of the radio communication apparatus. The interval of the sequential scan is desirably controlled according to moving speed of the radio communication apparatus.

The scan control unit 10 controls the value of the "MaxChannelTime" on the basis of the number of frequency channels to be scanned. The scan control unit 10 notifies the parameter control unit 9 to, for example, increase the value of the "MaxChannelTime" when the number of frequency channels is relatively large and reduce the value of the "MaxChannelTime" when the number of frequency channels is relatively small.

In the radio communication apparatus, which is the active scan terminal, the scan control unit 10 controls the value of the "MaxChannelTime". The scan control unit 10 monitors, for example, the number of transmission terminals of the probe response frame per unit time and notifies the parameter control unit 9 to increase the value of the "MaxChannelTime" when the number of transmission terminals is large and reduce the value of the "MaxChannelTime" when the number of transmission terminals is small.

In the radio communication apparatus, which is the active scan terminal, the scan control unit 10 can change registration order of the frequency channels of the "ChannelList" if many notifications of the carrier sense are received from the frequency channels registered in the "ChannelList" and notify the parameter control unit 9 of the changed "ChannelList". The scan control unit 10 can determine that use of a wireless LAN is impossible in a frequency channel in which the carrier sense is always notified, exclude the frequency channel from the "ChannelList" for a fixed time, and notify the parameter control unit 9 of the changed "ChannelList".

As described above, according to this embodiment, the radio communication apparatus can control the value of the response channel, the necessity of the response to the received probe request, and the value of the "MaxChannelTime" and change the "ChannelList". However, the operation of the scan control unit 10 is not limited to these operations. The conditions can be used in combination or can be switched and used. Note that the scan control unit 10 is realized by the processor 21 illustrated in FIG. 15 executing a program stored in the memory 22.

Third Embodiment

Figure 13:
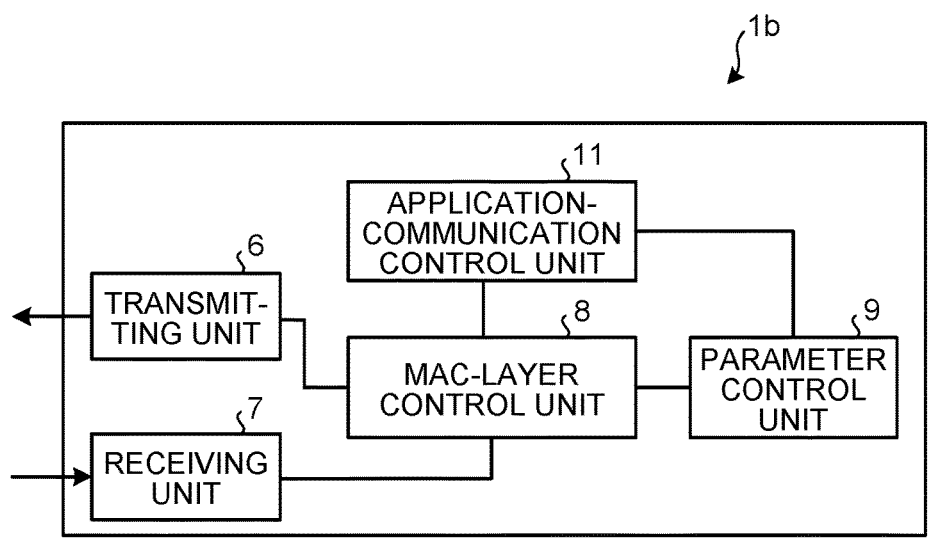
FIG. 13 is a diagram illustrating an example of the configuration of a radio communication apparatus in a third embodiment.

FIG. 13 is a diagram illustrating an example of the configuration of a radio communication apparatus 1b, which is a radio communication apparatus in this embodiment and is a modification of the radio communication apparatus 1. In FIG. 13, components common to FIG. 3 are denoted by the same reference numerals. In the configuration illustrated in FIG. 13, an application-communication control unit 11 is added to the configuration illustrated in FIG. 3. Note that modifications of the radio communication apparatuses 2A and 2B and the radio communication apparatuses 3A, 3B, and 3C in this embodiment also have the same configuration.

In the active scan terminal and the passive scan terminal, the application-communication control unit 11 notifies the parameter control unit 9 of application information desired to be shared between the radio communication apparatuses in the wireless LAN frame. The parameter control unit 9 includes the notified application information in the "VendorSpecificInfo" of the "MLME-SCAN. request" primitive.

Figure 14:
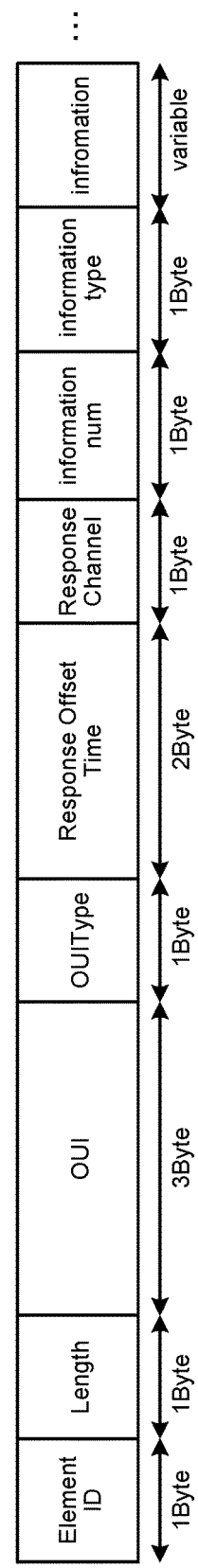
FIG. 14 is a diagram illustrating an example of a frame format of "VendorSpecificInfo" in the third embodiment.

In the probe request frame transmitted by the radio communication apparatus, which is the active scan terminal, in this embodiment, "VendorSpecificInfo", which is information peculiar to a terminal manufacturer, is included. FIG. 14 illustrates an example of a frame format of the "VendorSpecificInfo" illustrated in FIG. 14. A frame of the VendorSpecificInfo" illustrated in FIG. 14 is configured by an "Element ID" element of one byte, a "Length" element of one byte, a "OUI" element of three bytes, a "OUIType" element of one byte, a "Response Offset Time" element of two bytes, a "Response Channel" element of one byte, an "information num" element of one byte, an "information type" element of one byte, and an "information" element. In the frame format illustrated in FIG. 14, the "information num" element, the "information type" element, and the "information" element are added to the frame format illustrated in FIG. 7. The "information num" element indicates the number of combinations of the "information type" and "information" elements. The "information type" element indicates a type of information set in the "information" element. In the "information" element, application information that should be shared between the radio communication apparatuses is included. A plurality of combinations of the "information type" element and the "information" element can be included.

In the probe response frame transmitted by the passive scan terminal in this embodiment, the "VendorSpecificInfo" is included as in the active scan terminal.

The MAC-layer control unit 8 of the radio communication apparatus extracts the application information from the "VendorSpecificInfo" included in the received wireless LAN frame and notifies the application-communication control unit 11 of the application information. The application-communication control unit 11 can update application information in an application information source according to the notification from the MAC-layer control unit 8 and notify the parameter control unit 9 of the application information.

The application-communication control unit 11 of the radio communication apparatus, which is the active scan terminal, sets specific MAC address identification or personal identification information in the "information" element for the "VendorSpecificInfo". The "VendorSpecificInfo" extracted from the received probe response frame can be notified to the application-communication control unit 11 of the radio communication terminal, which is the passive scan terminal. The application-communication control unit 11 can respond to, with the probe response frame, only terminals that match the MAC address identification or personal identification information. In this way, the specific MAC address identification information and the personal identification information are superimposed on the specific MAC address identification, the probe request frame, and the response frame. Consequently, it is possible to share information only between specific users. Note that, when communication is performed only between specific radio communication apparatuses, it is also possible to identify the radio communication apparatuses using a value of an SSID element shared in advance of the probe response frame and perform the same communication without using the specific MAC address identification or the personal identification information included in the "VendorSpecificInfo".

When transmitting the probe response frame, the radio communication apparatus, which is the passive scan terminal, can include, in the "information" element of the "VendorSpecificInfo", a frequency channel in which the radio communication apparatus waits for the probe request frame. The active scan terminal, which receives the probe request frame including information concerning the waiting frequency channel from the passive scan terminal, only has to transmit the probe request frame only to the designated frequency channel.

In the radio communication apparatus, which is the active scan terminal, the active scan terminal, which receives the probe request frame including the information concerning the waiting frequency channel from the passive scan terminal, can notify the parameter control unit 9 to set, to a value of the response channel, a frequency channel in which a largest number of passive scan terminals are waiting.

The radio communication apparatus, which is the active scan terminal, can transmit a probe request by unicast or multicast and transmit a wireless LAN frame to a specific radio communication apparatus.

As described above, according to this embodiment, the radio communication apparatus can include the "VendorSpecificInfo", which is the information peculiar to the terminal manufacturer, in the probe request frame and the probe response frame and include the application information in the "VendorSpecificInfo". Transmission and reception of the wireless LAN frame can be performed only between the specific radio communication terminals. However, the operation of the application-communication control unit 11 is not limited to the operation described above. The conditions described above can be used in combination or can be switched and used.

As an example of application of this embodiment, the active scan terminal is mounted on a vehicle, the passive scan terminal is owned by a user, and shared information is superimposed on a probe request frame of the active scan terminal and a response frame of the passive scan terminal.

Note that this embodiment is described using the probe request and the probe response. However, the present invention is not limited to the probe request and the probe response. Reserved fields of a data frame, an action frame, a dedicated frame, an existing probe request frame can be used. Note that the application-communication control unit 11 is realized by the processor 21 illustrated in FIG. 15 executing the program stored in the memory 22.

Fourth Embodiment

In the first to third embodiments, which of the passive scan and the active scan the radio communication apparatus performs is fixed. However, the present invention is not limited to this. The radio communication apparatus can periodically switch the passive scan and the active scan. In FIG. 2, the radio communication apparatus 1 and the radio communication apparatuses 2A and 2B are the active scan terminals and the radio communication apparatuses 3A, 3B, and 3C are the passive scan terminals. However, the present invention is not limited to this. For example, when the radio communication apparatus 3A is the active scan terminal, the radio communication apparatus 3A can perform communication with the radio communication apparatuses 3B and 3C and can exchange information. Further, when the radio communication apparatus 1 and the radio communication apparatuses 2A and 2B are the passive scan terminals, the radio communication apparatus 1 and the radio communication apparatuses 2A and 2B can perform communication with a radio communication apparatus in another automobile and can exchange information.

Note that the passive scan and the active scan can be changed at timing when the user using the radio communication apparatus manually changes the passive scan and the active scan, can be changed at timing determined on the basis of time, or can be changed at timing determined on the basis of a received wireless LAN frame.

Note that the first to third embodiments can be combined or can be configured to be capable of being switched as long as the first to third embodiments are not contradictory.

Note that, in the first to third embodiments, the form in which the communication between the radio communication terminals is performed by the wireless LAN is described. However, the present invention is not limited to this. Radio communication other than the wireless LAN can be used. As an example, the present invention can be applied to radio communication for performing mutual terminal detection out of a plurality of frequency channel lists such as Bluetooth (registered trademark) or ZigBee (registered trademark).

Note that, as an example applied with the present invention, a radio communication system including a first radio communication apparatus and a second communication apparatus, the radio communication system superimposing information shared between the first radio communication apparatus and the second radio communication apparatus on a probe request frame periodically transmitted by the first radio communication apparatus to notify the second radio communication apparatus of the first radio communication apparatus. The first radio communication apparatus owned by a user periodically transmits the probe request frame to notify the second radio communication apparatus mounted on a vehicle of the position of the first radio communication apparatus. The second radio communication apparatus receives the probe request frame and informs a driver of the vehicle of the presence of the user from moving speed and a moving direction of the vehicle and the distance between the user and the vehicle.

INDUSTRIAL APPLICABILITY

As described above, the radio communication apparatus according to the present invention is useful for a radio communication apparatus that needs to find other radio communication apparatuses at high speed.

REFERENCE SIGNS LIST 1, 1a, 1b, 2A, 2B, 3A, 3B, 3C radio communication apparatus
4 wireless link (wireless LAN)
5 automobile
6 transmitting unit
7 receiving unit
8 MAC-layer control unit
9 parameter control unit
10 scan control unit
11 application-communication control unit
21 processor
22 memory
23 transmitter
24 receiver
25 system bus

The invention claimed is:

1. A radio communication system comprising:
a plurality of radio communication apparatuses including an active scan terminal and a passive scan terminal,
the active scan terminal is configured to:
after transmitting a probe request frame from one frequency channel, transmit a probe request frame from other frequency channels without waiting for a response frame from the other radio communication apparatuses;
transmit a probe request frame from a response channel, which is a waiting channel, and wait for a response from the passive scan terminal,
the probe request frames comprising information concerning an offset time to the response and information concerning the response channel, and
the passive scan terminal is configured to:
after receiving the probe request frame, after elapse of the offset time to the response, transmit a probe response frame from a frequency channel designated by the response channel information.

2. The radio communication system according to claim 1, wherein the radio communication system periodically switches the passive scan terminal to the active scan terminal and switches the active scan terminal to the passive scan terminal.

3. The radio communication system according to claim 1, wherein
the active scan terminal is configured to:
after transmitting the probe request, finally transmit the probe request frame from the response channel which is the waiting channel; and
superimpose, on the probe request frame, the information concerning the offset time to the response and the information concerning the response channel.

4. A radio communication apparatus, which is an active scan terminal, of a radio communication system in which a plurality of radio communication apparatuses including the active scan terminal and a passive scan terminal communicate,
the radio communication apparatus is configured to:
after transmitting a probe request frame from one frequency channel, transmit a probe request frame from a plurality of other frequency channels without waiting for a response frame from the other radio communication apparatuses;
transmit a probe request frame from a response channel, which is a waiting channel, and waits for a response from the passive scan terminal,
the probe request frame comprising information concerning an offset time to the response and information concerning the response channel.

5. The radio communication apparatus according to claim 4, wherein, after receiving the probe request frame from the radio communication terminal, which is the active scan terminal, after the elapse of the offset time to the response, the radio communication apparatus transmits a probe response frame from a frequency channel designated by the response channel information.

6. The radio communication apparatus according to claim 5, wherein there is time when the radio communication apparatus does not response to the active scan terminal to which the radio communication apparatus responded.

7. The radio communication apparatus according to claim 4, wherein a waiting time for the response is set on the basis of a number of frequency channels for transmitting the probe request frame or a received number of the response frames.

8. The radio communication apparatus according to claim 4, wherein the response channel is set on the basis of a number of times of carrier sense notification per unit time and set again according to a moving distance of the passive scan terminal.

9. The radio communication apparatus according to claim 4, wherein the radio communication apparatus is configured to:
increase a transmission interval of the probe request frame when responses per unit time from the passive scan terminal are less than a threshold;
reduce the transmission interval of the probe request frame when the responses per unit time from the passive scan terminal are equal to or more than the threshold; and
change the transmission interval of the probe request frame according to moving speed of the passive scan terminal.

10. The radio communication apparatus according to claim 4, wherein
the active scan terminal is mounted on a vehicle and the passive scan terminal is owned by a user, and
the radio communication apparatus superimposes shared information on the probe request frame of the active scan terminal and the response frame of the passive scan terminal.

11. The radio communication apparatus according to claim 4, wherein a sequential scan during movement is performed at an interval shorter than a sequential scan during a stop, and an interval of the sequential scans is controlled on the basis of moving speed of the radio communication apparatus.

12. The radio communication apparatus according to claim 4, wherein the radio communication apparatus superimposes specific MAC address identification information and personal identification information on specific MAC address identification, the probe request frame, and the response frame to share information only between specific users.

13. The radio communication apparatus according to claim 4, wherein the radio communication apparatus is configured to:

continuously transmit the probe request frame from all of the plurality of other frequency channels;

thereafter finally transmit the probe request frame from the response channel, which is the waiting channel; and superimpose, on the probe request frame, the information concerning the offset time to the response and the information concerning the response channel.

* * * * *